UNITED STATES PATENT OFFICE.

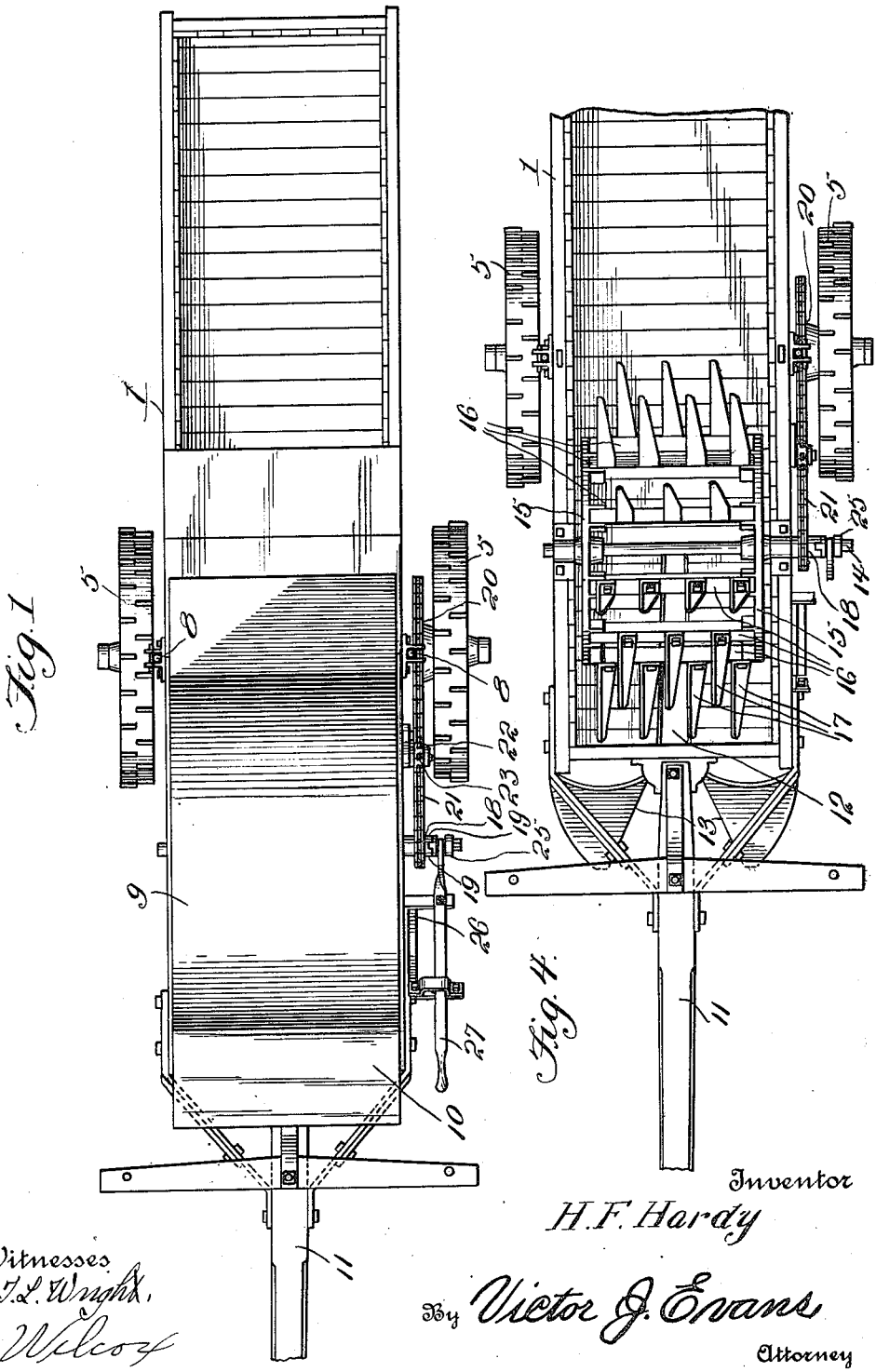

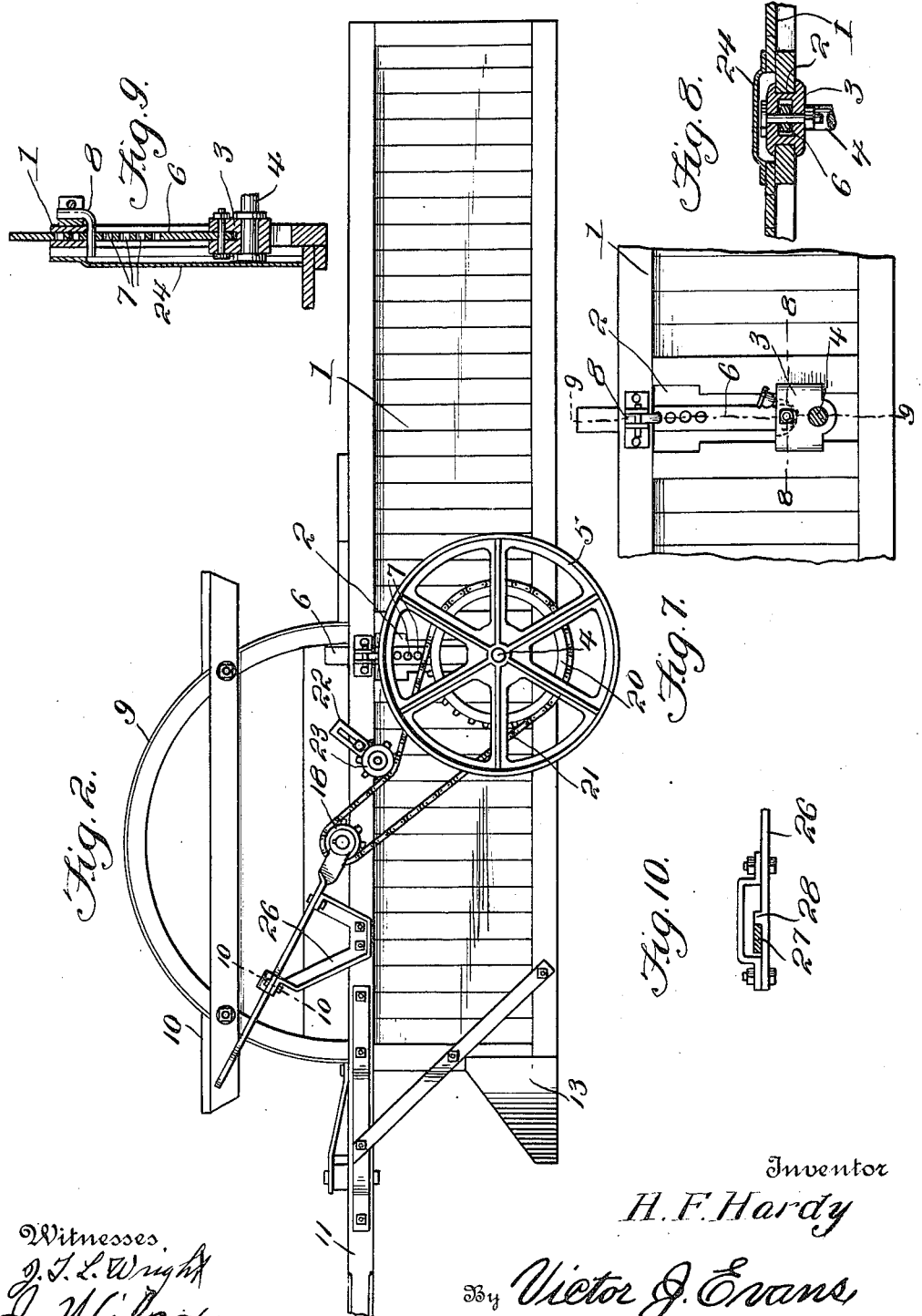

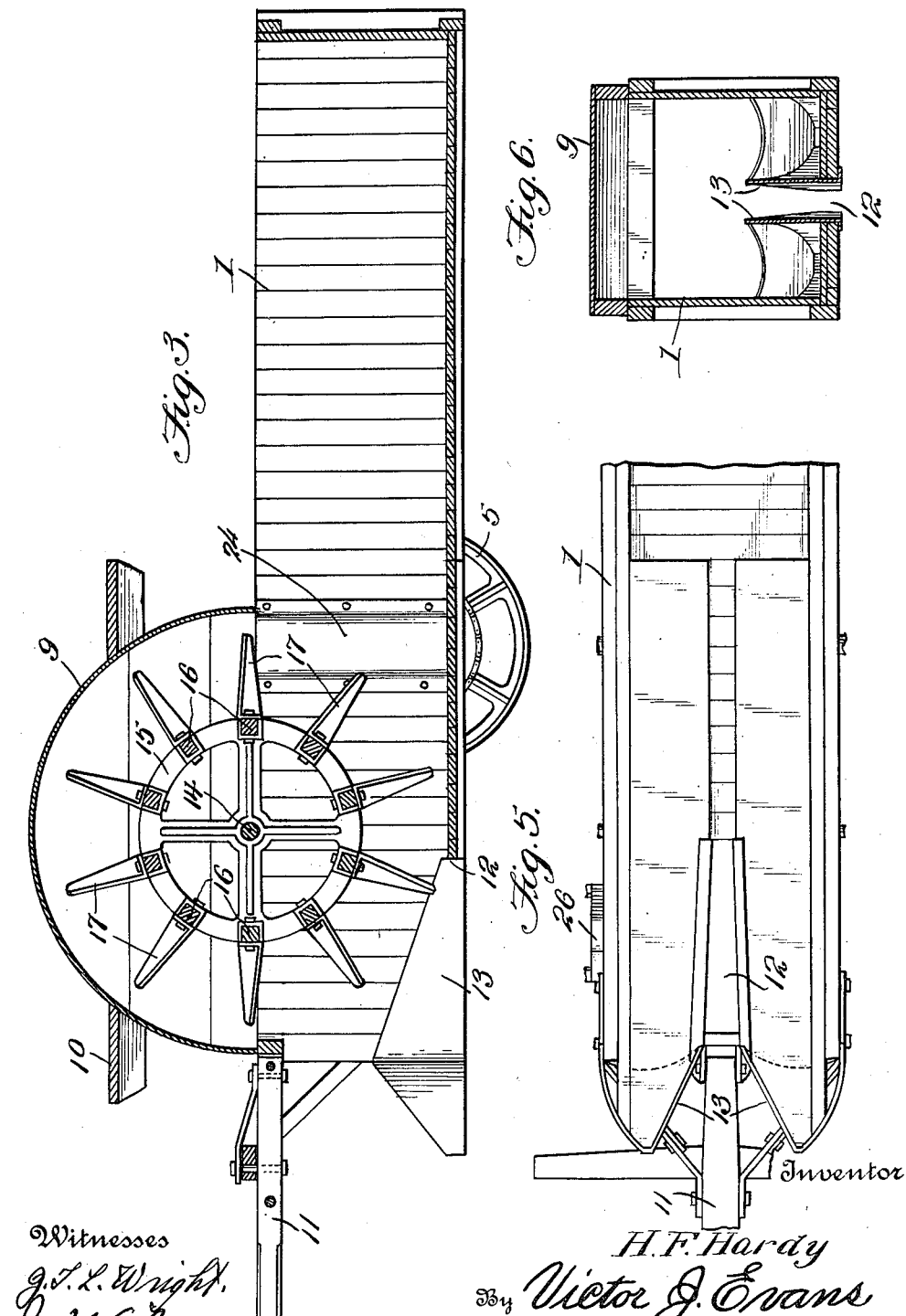

HERMAN F. HARDY, OF JASON, NORTH CAROLINA.

BEAN-HARVESTER.

1,271,705.  Specification of Letters Patent.  Patented July 9, 1918.

Application filed November 3, 1917. Serial No. 200,153.

*To all whom it may concern:*

Be it known that I, HERMAN F. HARDY, a citizen of the United States, residing at Jason, in the county of Greene and State of North Carolina, have invented new and useful Improvements in Bean-Harvesters, of which the following is a specification.

This invention relates to bean harvesting machines and it consists in the novel features hereinafter described and claimed.

An object of the invention is to provide a machine of the character stated adapted to be drawn over the surface of the ground and provided with means for beating or threshing the beans from the standing vines or plants and for conveying the beans to a bin or receptacle with which the machine is provided. The body of the machine is provided at its bottom and at its forward end with a recess and fenders or guards are mounted at the forward portion of the body and at the sides of the said recess and are adapted to direct the vines or plants into the recess and prevent the loss of beans out of the front end of the body after they are beaten off.

In the accompanying drawings:—

Figure 1 is a top plan view of the bean harvester;

Fig. 2 is a side elevation of the same;

Fig. 3 is a longitudinal sectional view of the same.

Fig. 4 is a fragmentary top plan view of the same.

Fig. 5 is a similar view with intermediate parts removed.

Fig. 6 is a transverse sectional view of the same.

Fig. 7 is a detailed side elevation of an intermediate portion of the harvester with parts shown in section.

Fig. 8 is a detailed sectional view cut on the line 8—8 of Fig. 7.

Fig. 9 is a vertical sectional view cut on the line 9—9 of Fig. 7.

Fig. 10 is a detailed sectional view cut on the line 10—10 of Fig. 2.

The bean harvester comprises a body 1 of wood or other suitable material and the side body is provided at its opposite sides with vertically disposed recesses 2. Boxes 3 are slidably mounted in the recesses 2 and carry axles 4 upon which wheels 5 are journaled. Strips 6 are attached to the boxes 3 and extend along the upper portions of the recesses 2 and pass vertically through the upper portions of the sides of the body 1. The said strips 6 are provided with perforations 7 through which pins 8 may be passed whereby the strips and the boxes are held at adjusted positions in said recesses. The body 1 rests upon the pins 8 as best indicated in Fig. 9.

A hood 9 is mounted upon the forward portion of the body 1 and carries a platform 10 upon which the driver or operator may sit. A tongue 11 is connected with the upper forward portion of the body 1 in a suitable manner and draft animals (not shown) may be connected with the tongue for drawing the machine over the ground. The body 1 is provided at its bottom and at its forward end with a recess 12 which is disposed longitudinally of the body and along the median longitudinal dimension thereof. Fenders or shields 13 are attached to the bottom of the body 1 and extend along the edges of the recess 12 and the said fenders or shields are pointed at their forward ends and are spaced from each other.

A shaft 14 is journaled upon the body 1 below the hood 9 and spiders 15 are mounted upon the said shaft under the hood and between the sides of the body. Bars 16 are connected at their ends with the spiders 15 and are disposed parallel with the shaft 14 and are spaced from each other. Radially disposed fingers 17 are mounted upon the bars 16 and are adapted to move over the bottom of the forward portion of the body 1 and over the recess 12 thereof. A clutch sprocket 18 runs idle on shaft 14 and is provided with a series of teeth 19. A sprocket wheel 20 is fixed with relation to axle 4 and a chain 21 is trained around the sprocket wheel 20 and the teeth 19. A bracket 22 is adjustably mounted upon the body 1 and carries a sprocket wheel 23 which bears against the upper run of the chain 21 and serves to hold the chain in a tight condition. Plates 24 are attached to the inner surfaces of the sides of the body 1 and extend across the recesses 2 and prevent the beans from passing through the said recesses.

A clutch member 25 with key attached slides upon the shaft 14 and is adapted to engage the clutch member 18 whereby rotary movement may be transmitted from axle 4 to the shaft 14. A bracket 26 is mounted upon the body 1 and a lever is pivoted upon the said bracket and engages the clutch member 25 with clutch sprocket 18. The bracket 26 is provided with an upstanding lug 28 and the lever 27 is made of flexible material as for instance iron and may be swung in an upward direction above the upper end of the lug 28 and positioned at either side of the lug whereby the said lever is held at an adjusted position. It is apparent that by swinging the lever the clutch member 25 may be moved into or out of engagement with the clutch member 18.

As the machine is drawn over the surface of the ground and when the clutch members are in engagement with each other the spiders 15 and the teeth 17 rotate with the axis of the shaft 14. The vines or plants are directed by the fenders 13 into the recess 12 and as the teeth come in contact with the vines or plants they beat or thresh the beans from the plants and cast them back into the rear portion of the body 1 and the plants are left standing in the soil. When a sufficient quantity of beans have accumulated in the body 1 they may be removed therefrom by shoveling or otherwise.

From the foregoing description taken in conjunction with the accompanying drawings, it will be seen that a bean harvester of simple and durable structure is provided and that the same may be used to advantage for economically harvesting beans, peas and similar vegetables.

Having described the invention what is claimed is:—

A harvester comprising a body provided at its sides with slots, journaled boxes adjustably mounted in the slots, means for securing the boxes in adjusted position, wheels having axles journaled in the boxes and plates mounted on the sides of the body and bringing the slots beyond the inner surfaces of the boxes.

In testimony whereof I affix my signature.

HERMAN F. HARDY.